United States Patent Office 3,574,837
Patented Apr. 13, 1971

3,574,837
NEW SCHIFF'S BASES, AND THEIR USE AS AGRICULTURAL PESTICIDES
Henri Pacheco, Bron, and Lucien Cronenberger, Daniel Pillon, and Jean Thiolliere, Lyon, France, assignors to PEPRO-Societe pour le Developpement et la Vente de Specialites Chimiques, Lyon, France
No Drawing. Filed May 21, 1968, Ser. No. 730,935
Claims priority, application France, May 26, 1967, 48,715
Int. Cl. C07c 119/10
U.S. Cl. 424—248
9 Claims

ABSTRACT OF THE DISCLOSURE

New Schiff's bases having the general formula

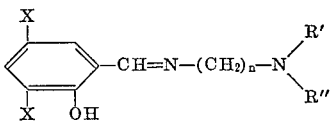

wherein X is halogen, n is 2 or 3, and R' and R" are identical or different alkyl radicals which may also form a heterocycle with the nitrogen atom and may contain another heteroatom of O, N or S; and the quaternary salts and metal chelates thereof; and their use as fungicides.

---

The present invention relates to new chemical products having the general formula:

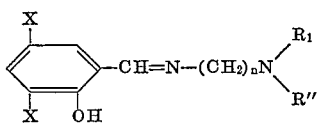

wherein X is halogen, n is 2 or 3, R' and R" are identical or different lower alkyl radicals, which may also form with the nitrogen atom a six member heterocycle which may contain another heteroatom such as O.

The invention relates also to the quaternary ammonium salts of the above compounds, and to the chelates of said compounds with divalent metals.

Lastly, the invention isconcerned with the use of said compounds as agricultural pesticides, in particular as fungicides.

Said compounds are produced readily, with satisfactory yields, by condensing a dihalogenated salicylic aldehyde on an amine having the formula $H_2N(CH_2)_nNR'R''$, according to one of the following methods:

(a) Condensation is carried out at ordinary temperature, by mixing equimolecular amounts of aldehyde and amine, which have been previously dissolved in a suitable solvent such as methanol. The solution turns yellow immediately, and then, after a period of time ranging from a few seconds to several hours, the derivative crystallizes. The precipitate is drained, and then re-crystallized in a solvent such as ethanol or methylketone.

(b) The above equimolecular mixture of aldehyde and amine is heated in toluene, with azeotropic removal of the water formed during the reaction. When the derivative cannot be crystallized by cooling, the solvent is allowed to evaporate at reduced pressure, and the residue re-crystallizes in water or in an organic solvent such as methanol.

The following compounds were prepared according to either of the above-mentioned methods:

| Number: | X | n | NR'R" | Yield, percent | Melting point, °C. |
|---|---|---|---|---|---|
| 1 | I | 2 | N◯O | 88 | 96 |
| 2 | Cl | 2 | N◯ | 83 | 65 |
| 3 | I | 2 | N(C₂H₅)₂ | 44 | 73 |
| 4 | I | 2 | N◯ | 56 | 95 |
| 5 | Cl | 2 | N(C₂H₅)₂ | 69 | 33 |

PREPARING THE QUARTERNARY AMMONIUM SALTS

The quaternary ammonium salts of the above Schiff's bases are readily prepared by allowing a suitable acid or an alkyl halide to react with such a Schiff's base. By way of example, 0.1 mole of a Schiff's base and 0.2 mole of ethyl iodide are poured into an autoclave, and the mixture is heated at 110° C. for 3 hours. The excess ethyl iodide is then removed, and the residue is re-crystallized in ethanol.

The following compounds were obtained by said method:

No. 6

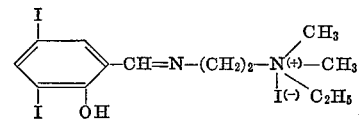

Yield=18%; M.P. 196° C.

No. 7

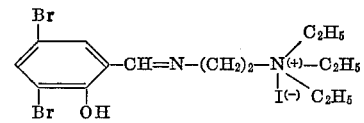

Yield=57%— M.P. 183° C.

PREPARING THE CHELATES

The chelates are produced by allowing a soluble metal salt to react with the Schiff's base.

By way of example, a concentrated aqueous solution containing 0.1 mole of metal acetate, is poured at ordinary temperature into an alcoholic solution containing 0.2 mole of Schiff's base. The chelate precipitates immediately. After being drained, and then washed in water and ethanol, it re-crystallizes as a rule in ethanol, methylethylketone, dimethylformamide, or a mixture of said solvents. The copper chelate of compound No. 5 (yield=22%—M.P. 145° C.) was prepared by this method.

The fungicidal action of the above compounds was determined by tests on a number of plant parasitic fungi. Obviously, the fungi in the tests described hereinafter are only mentioned by way of example, to illustrate the fungicidal activity of the compounds according to the invention, and do not represent the whole range of activity of said compounds.

(I) Tests on living plants

The tests are carried out as preventive treatments. The individual plant is first treated with a mixture prepared from a wettable powder diluted so as to have a concentration of 2 g./l. of active material. The plant is then infected with spores of the fungus selected. After from 5 to 15 days, depending on the fungus selected, the fungicidal activity is observed, and given a mark from 0 (no action) to 4 (total action).

In every test, the products according to the invention were compared with salicylidene aniline having the formula

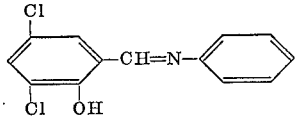

the fungicidal action of which was studied by Smith and Read (Annals of Applied Biology 1961, 49, 242–245).

(a) Test relating to corn-mildew.—In this test, the compounds Nos. 1, 2, 3, 4, 5, 6, and 7 obtained a mark 4 for protection against *Erysiphe graminis*, which is the cause of corn-mildew. Under the same conditions, the salicylidene aniline of Smith and Read only obtains a mark 2.

(b) Test relating to "*Alternaria solani*" (tomatoes).— In this test, the compounds Nos. 3, 4, and 5, obtained a mark 4, whereas the product studied by Smith and Read only obtained a mark 3.

(c) Test relating to celery septoriosis.—In this test, relating to protection against *Septoria apii*, the compounds 1, 2, 3, 4, 6, and 7, obtained a mark 4, whereas the product of Smith and Read only obtained a mark 3.

(II) Tests on vine leaves

The treatment is effected by means of the same wettable powder (diluted so as its concentration is 0.01 g./l. of active material), on a vine leaf still alive, which is then infected with *Plasmopara viticola*.

In this test, the compounds 1, 3, 5 and 6, in doses of 0.001 g./l., provide a total protection.

With a dose of the product of Smith and Read 100 times higher, the same protection is barely obtained.

With a view to using practically the compounds according to the invention, said compounds should be formulated according to the technics conventionally used in the pesticide industry. Thus, they may be used as powders to be sprinkled, wettable powders, solutions, direct or reversed emulsions of water in oil, or oil in water, and the like.

These various types of formulations require normally the addition of inert carriers, such as clays, talc, or the like, solvents such as water or organic solvents, as well as various adjuvants adapted to further the use and physical properties of the compositions produced. Such adjuvants may be emulsifying agents, and/or anticaking agents, and/or wetting agents, and/or sticking agents, and the like.

What is claimed is:

1. A Schiff's base having the general formula

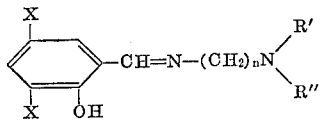

wherein X is halogen, *n* is 2 or 3, and R' and R" are identical or different lower alkyl radicals which may also form a six-member heterocycle with the nitrogen atom selected from the group consisting of morpholino and piperidino or the quaternary salt or the copper chelate of said base.

2. A compound according to claim 1 having the formula

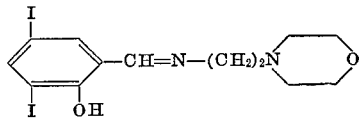

3. A compound according to claim 1 having the general formula

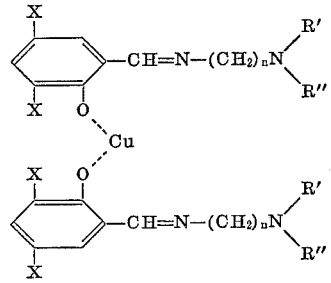

wherein X, *n*, R' and R" are in accordance with claim 1.

4. A fungicidal composition for agricultural use comprising a compound of claim 1 and a carrier therefor.

5. A fungicidal composition according to claim 4 wherein said composition as a concentration of the active ingredient of at least 0.001 g./l.

6. A compound in accordance with claim 1 wherein *n* is 2 and NR'R" is

7. A compound in accordance with claim 1 wherein *n* is 2 and NR'R" is N(C₂H₅)₂.

8. A compound in accordance with claim 1 having the formula

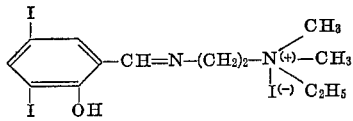

9. A compound in accordance with claim 1 having the formula

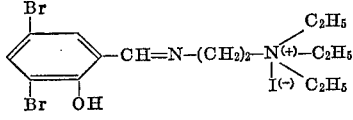

References Cited

UNITED STATES PATENTS 2,582,292  1/1952  Sondern et al. _____ 260—566X
2,888,458  5/1959  Stromberg _____ 260—240

OTHER REFERENCES

Chapman et al.: J. Chem. Soc., 1963, p. 2259.
Chemical Abstracts, vol. 52, col. 14947 (1953).

JOHN D. RANDOLPH, Primary Examiner

U.S. Cl. X.R.

424—267, 329; 260—240, 438.1; 270—566